(12) United States Patent
Iasso

(10) Patent No.: US 8,555,354 B2
(45) Date of Patent: Oct. 8, 2013

(54) SYSTEMS AND METHODS FOR SECURE WATCHLISTING

(75) Inventor: Anthony S. Iasso, Haymarket, VA (US)

(73) Assignee: Anthony S. Iasso, Haymarkey, VA (US)

( * ) Notice: Subject to any disclaimer, the term of this patent is extended or adjusted under 35 U.S.C. 154(b) by 75 days.

(21) Appl. No.: 12/918,581

(22) PCT Filed: Feb. 21, 2008

(86) PCT No.: PCT/US2008/054594
§ 371 (c)(1),
(2), (4) Date: Mar. 1, 2011

(87) PCT Pub. No.: WO2009/105107
PCT Pub. Date: Aug. 27, 2009

(65) Prior Publication Data
US 2011/0142237 A1 Jun. 16, 2011

(51) Int. Cl.
*H04L 29/06* (2006.01)

(52) U.S. Cl.
USPC ........ 726/5; 380/259; 340/573.4; 340/539.13

(58) Field of Classification Search
USPC ............................................................ 726/5
See application file for complete search history.

(56) References Cited

U.S. PATENT DOCUMENTS

| | | | |
|---|---|---|---|
| 6,044,155 A * | 3/2000 | Thomlinson et al. | ......... 713/155 |
| 6,437,696 B1 | 8/2002 | Lemelson et al. | |
| 7,334,130 B2 * | 2/2008 | Bowers | ......................... 713/186 |
| 2003/0086549 A1 | 5/2003 | Boehmke | |
| 2004/0168061 A1 | 8/2004 | Kostal et al. | |
| 2005/0273453 A1 | 12/2005 | Holloran | |
| 2006/0018520 A1 | 1/2006 | Holloran | |
| 2007/0106892 A1 | 5/2007 | Engberg | |
| 2007/0159343 A1 * | 7/2007 | Crucilla | ..................... 340/573.4 |

OTHER PUBLICATIONS

Md. Headayetullah and G.K. Pradhan, "Efficient and Secure Information Sharing for Security Personnels: A Role and Cooperation Based Approach," International Journal on Computer Science and Engineering vol. 02, No. 04, 2010, 1254-1265.*
International Preliminary Report on Patentability from the International Bureau in related application No. PCT/US2008/054594 mailed Sep. 2, 2010.
International Search Report in related application PCT/US2008/54594 mailed Oct. 1, 2008.

* cited by examiner

*Primary Examiner* — Taghi Arani
*Assistant Examiner* — Narciso Victoria
(74) *Attorney, Agent, or Firm* — The Fletcher Law Firm PLLC; Brian N. Fletcher

(57) ABSTRACT

A watchlisting module is configured to securely and efficiently create, modify, manage, and store a watchlist. The watchlisting module is configured to generate a watchlist consisting of watchlist entries. Each watchlist entry encapsulates information about an entity to be associated with the watchlist. The watchlist entry includes information about the entity including a unique identifier for the watchlist, a unique identifier of the watchlist entry, a unique identifier for the entity, and access control information for membership process related to the watchlist. The watchlist entry also includes a State Lock. Watchlisting module is configured to utilize the State Lock to secure and verify a watchlist entry.

21 Claims, 15 Drawing Sheets

FIG. 8B

SYSTEMS AND METHODS FOR SECURE WATCHLISTING

GOVERNMENT INTEREST

The development of this invention was supported, in part, by the Department of the Army under contract number: Prime Contract # DASG60-02-D-0006, Sub contract #4400135566. The United States Government may have certain rights in this invention.

FIELD

This invention relates generally to security systems and methods.

BACKGROUND

Security systems implement various processes for identifying and verifying the identity of a person. Typically, security systems also track entities in order to prevent dangerous or suspected dangerous entities from causing mischief. Watchlisting is a process implemented by security systems in order to identify and track entities.

Watchlisting typically consists of creating and maintaining a watchlist of entities that are suspected of dangerous activities. The watchlist contains information that identifies the entities and the reasons for inclusion in the list. To prevent mischief by the entities, the watchlist is passed to different security systems and personal. As such, the system and personal can compare entities, in contact with the systems and personal, to the watchlist.

However, in typical watchlisting process, the security systems do not provide secure and efficient management of the information in the watchlists. Thus, there is a need in the art for a mechanism to provide secure and efficient watchlisting systems and methods.

BRIEF DESCRIPTION OF THE DRAWINGS

The accompanying drawings, which are incorporated in and constitute a part of this specification, illustrate embodiments of the present disclosure and together with the description, serve to explain the embodiments.

FIGS. 8A and 8B are diagrams illustrating exemplary membership process user interfaces consistent with embodiments of the present disclosure.

DETAILED DESCRIPTION

According to embodiments of the present disclosure, a watchlisting module is configured to securely and efficiently create, modify, manage, and store a watchlist. The watchlisting module is configured to generate a watchlist consisting of watchlist entries. Each watchlist entry encapsulates information about an entity to be associated with the watchlist. The watchlist entry includes information about the entity including a unique identifier for the watchlist, a unique identifier of the watchlist entry, a unique identifier for the entity, and access control information for membership process related to the watchlist. The watchlist entry also includes a State Lock. Watchlisting module is configured to utilize the State Lock to secure and verify a watchlist entry.

The watchlisting module is configured to generate user interfaces to allow a user to create a watchlist. The watchlisting module is also configured to generate user interfaces to allow a user to add entities in the watchlist and manage existing watchlists and watchlist entries.

Reference will now be made in detail to the exemplary embodiments of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the embodiments and it is to be understood that other embodiments can be used and that changes can be made without departing from the scope of this disclosure. The following description is, therefore, merely exemplary.

Figure 1:
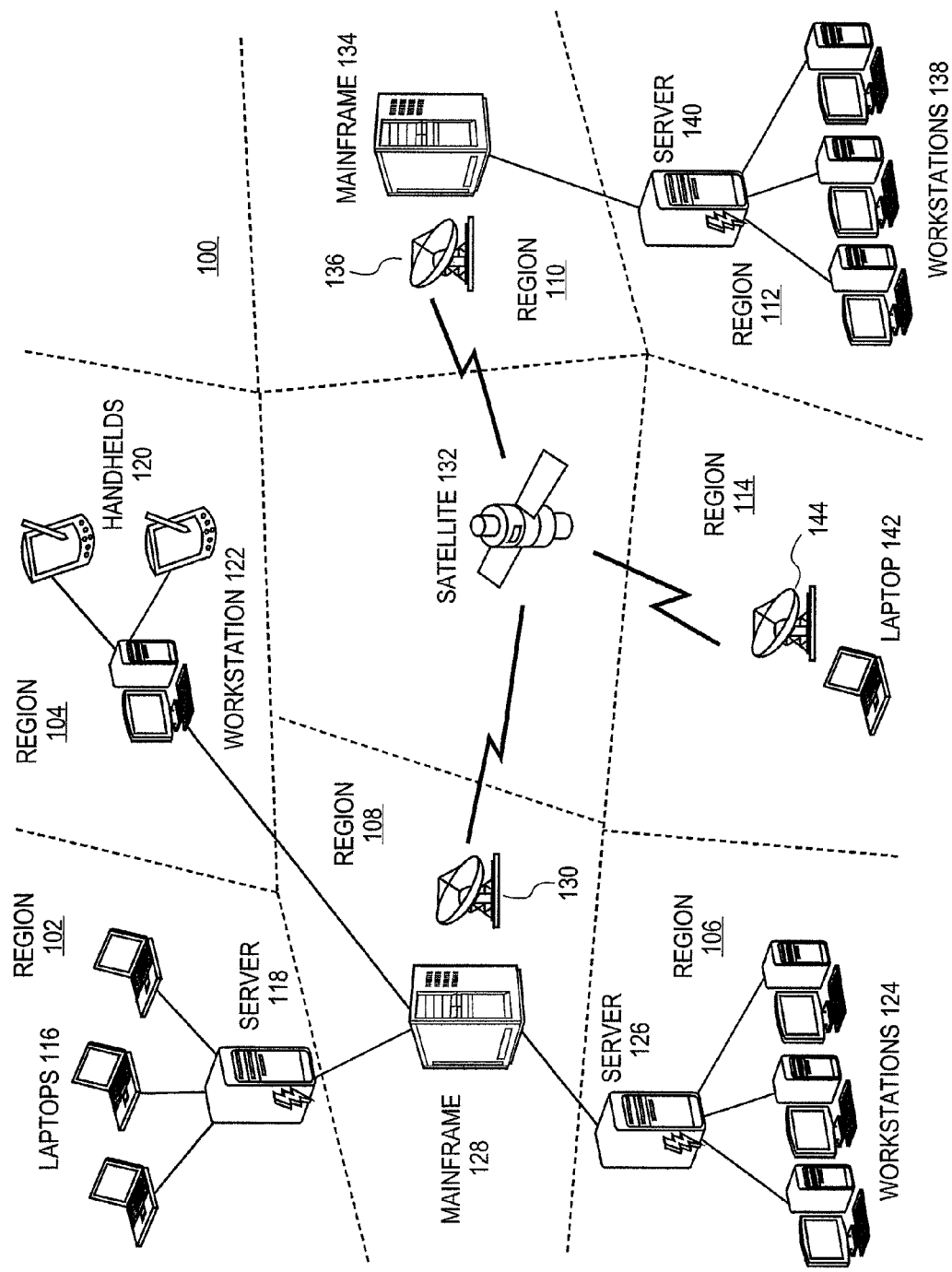
FIG. 1 is a diagram illustrating an entity identification and tracking system consistent with embodiments of the present disclosure.

A watchlisting module allows wide scale capture and tracking of information about entities. FIG. 1 is a diagram illustrating an entity identification and tracking system 100 capable of implementing a watchlisting module consistent with embodiments of the disclosure. The system includes multiple computing systems located in various geographic regions. Each computing system in system 100 can implement an instance of the watchlisting module. Each of the computing systems capture information about entities and use the watchlisting module to process, store, manage, track, and share the information about the entities. For example, the information can include identity information about the entities.

As illustrated in FIG. 1, the computing systems can be located in seven different geographic regions: Region 102, Region 104, Region 106, Region 108, Region 110, Region 112, and Region 114. The geographic regions can be located at any place in the world. For example, the geographic regions can be located in a single city. Furthermore, the geographic regions can be spread out over the entire globe with multiple regions located in different countries or on different continents. One skilled in the art will realize that the geographic regions and computing systems illustrated in FIG. 1 are exemplary and that system 100 can include any number of computing systems located in any number of geographic regions.

As shown, Region 102 can include several laptop computing systems 116 networked to a server computing system 118. Region 104 can include several handheld computing systems 120 networked to a workstation computing system 122. Region 106 can include several workstation computing systems 124 networked to a server computing system 126. Region 108 can include a mainframe computing system 128 networked to the computing systems in Regions 102, 104, and 106. Region 108 can include a satellite uplink 130 to transmit information to other regions via satellite 132.

Region 110 can include another mainframe computing system 134 networked to the computer systems in Region 112 and can include a satellite uplink 136 to transmit information to other regions, such as Regions 102, 104, 106, and 108 via satellite 132. Region 112 can include several workstation computing systems 138 networked to a server computing system 140. Region 114 can include a laptop computing system 142 and a satellite uplink 144 to communicate to other geographic regions via satellite 132.

The computing systems can communicate with one another via any type of communication channel and protocol. For example, the computing systems in a particular geographic region can be networked in a LAN configuration. Further, all the computing systems in system 100 can be networked in a WAN configuration. The computing systems can communicate via any type of communication channel such as wired, satellite, cellular, radio frequencies including WiFi (802.11a, b, g, n), or any other current or future wired or wireless protocols.

System 100 allows the capture, processing, storing, managing, tracking and sharing of information from entities. The information allows system 100 to identify, classify, and track the entities that come in contact with system 100. In order to identify, classify, and track the entities, the computing systems of the geographic regions can implement a watchlisting module. For example, the computing system can implement an application providing the features and functionality of the watchlisting module. Additionally, the watchlisting module can be configured to function with other security applications in order to identify, classify, and track the entities. For example, the watchlisting module can be configured to function as a feature of a Biometrics Automation Toolset (BAT) as described in U.S. patent application Ser. No. 11/966,333 filed on Dec. 28, 2007, the specification of which is incorporated herein in its entirety by reference.

For example, system 100 can be used in a conflict setting in which information about entities can be used to distinguish friend from foe. As such, geographic Regions 102, 104, 106, and 108 can be located in the theater of conflict. Military personnel can desire to identify and track entities in the theater in order to distinguish friend and foe and to identify and track entities as they travel between geographic regions. Accordingly, the personnel in Regions 102, 104, 106, and 108 can use the computing systems with the watchlisting module to capture information such as identification information, physical description, biometric information, entities status, reason for interest, and the like. The personnel can use the watchlisting module to capture the information, organize the information, manage the information, store the information, and share the information with other computing systems in system 100.

The personnel can also use the watchlisting module to share and retrieve information about entities from other geographic regions. This allows the personnel, for example, to identify entities in real time at virtually any location and thereby identify and prevent foes from traveling region to region and creating mischief. Further, the personnel can use watchlisting module to transmit the information and retrieve information from regions outside the theater of conflict such as Regions 110, 112, and 114.

System 100 above illustrates computing systems positioned and communicating in several configurations. One skilled in the art will realize that the configuration of the computing systems in system 100 is exemplary and that the computing systems can be arranged in various configurations according to local capability and need in order to communicate by various procedures.

For example, a single laptop computing system can be located in another geographic region (not shown). As such, data can be moved using removable and recordable media such as a USB drive or a CD-R instead of by direct network link. Additionally, for example, several laptops computing systems can be networked together, with one designated as the local "server."

Figure 2:
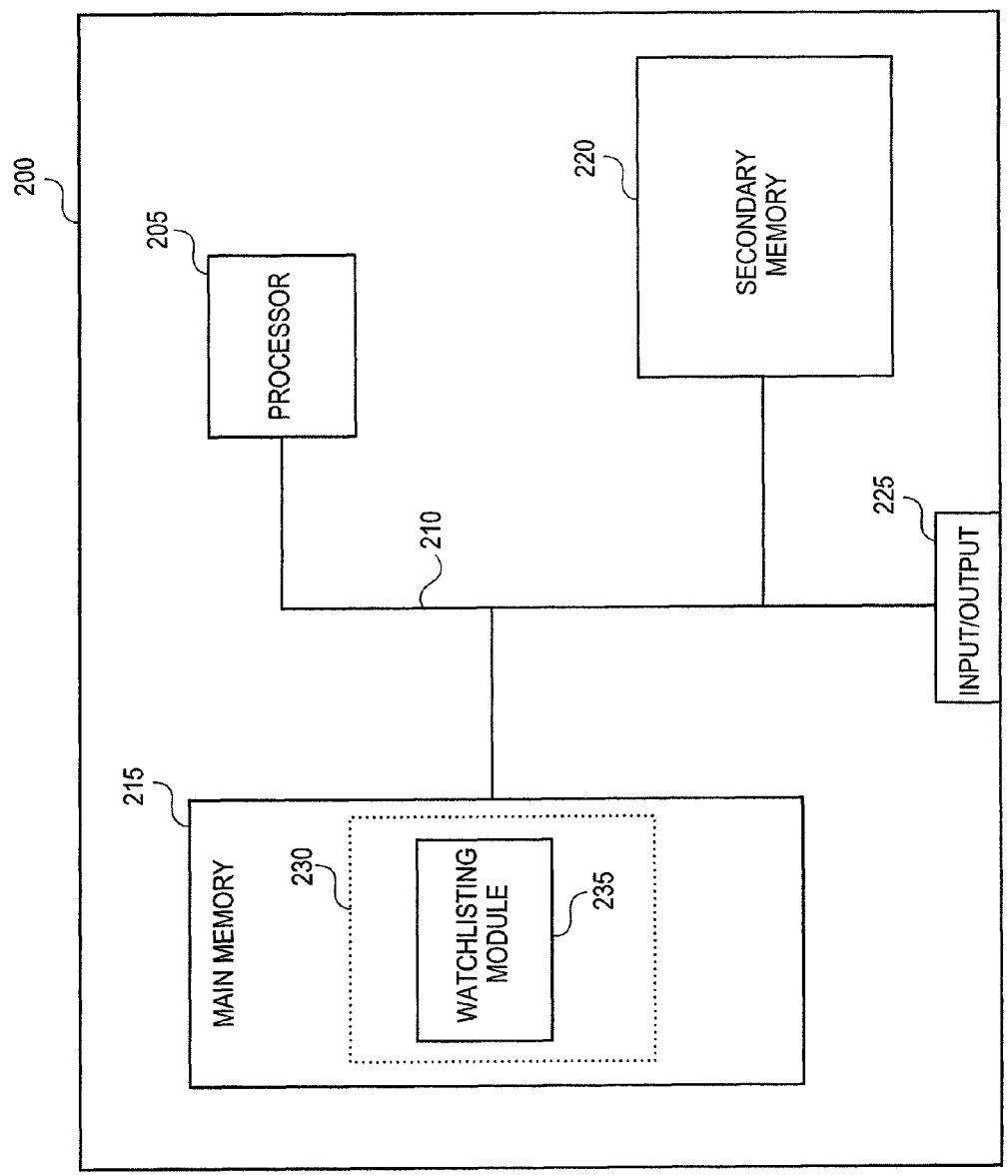
FIG. 2 is a diagram illustrating an exemplary computing system in the entity identification and tracking system consistent with embodiments of the present disclosure.

As mentioned above, the computer systems of system 100 utilize a watchlisting module to capture, organize, manage, store, and share information for identifying, recording, and tracking entities. In system 100, the various computing systems can include a computing platform to function as a platform for the watchlisting module. FIG. 2 is a diagram illustrating an exemplary configuration of a computing platform 200, in which the watchlisting module can be implemented. As illustrated, computing platform 200 can include a processor 205, communication bus 210, main memory 215, secondary memory 220, and input/output 225. One skilled in the art will realize that the components of computing platform 200 are exemplary and computing platform 200 can include additional hardware.

As shown in FIG. 2, computing platform 200 can include one or more processors, such as processor 205 that provide an execution platform for embodiments of an application 230 and a watchlisting module 235. Processor 205 can be, for example, a central processing unit (CPU), a micro-controller unit (MCU), digital signal processor (DSP), or the like. Commands and data from processor 205 are communicated over a communication bus 210. Computing platform 200 also includes a main memory 215, such as a Random Access Memory (RAM), where application 230 including watchlisting module 235 can be executed during runtime, and a secondary memory 220. Additionally, an operating system (OS) such as those from MICROSOFT® can be executed on main memory 215 during runtime.

Secondary memory 220 can include, for example, a hard disk drive (not shown) and/or a removable storage drive (not shown), representing a floppy diskette drive, a magnetic tape drive, a compact disk drive, etc., where a copy, whole or in part, of a computer program embodiment for application 230 and watchlisting module 235 can be stored. For example, application 230 and watchlisting module 235 can be stored in secondary memory 220 and, during runtime, application 230 and watchlisting module 235, whole or in part, can be loaded into main memory 215.

Input/output 225 provides an interface where data can be transferred to and from computing platform 200. For example, input/output 225 can include a keyboard, a mouse, a display, a network interface, sound device and the like.

Application 230 can be any type of application capable of functioning with watchlisting module 235 to implement the functionality of watchlisting module 235. For example, application 230 can be a standalone application designed to solely perform the functionality of watchlisting module 235. Additionally, application 230 can be a security application, such as BAT, that provides additional functionality in combination with the functionality of watchlisting module 235.

Application 230 and watchlisting module 235 can be written in program code and executed by computing platform 200. Application 230 and watchlisting module 235 can be implemented in computer languages such as PASCAL, C, C++, JAVA, HTML, XML and the like. One skilled in the art will realize that the components, functions, and methods described above and below can be implemented in any computer language and any application capable of implementing BAT.

Application 230 and watchlisting module 235 can be embodied in secondary memory 220 and/or main memory 215 (as illustrated) as instructions for causing computing platform 200 to perform the instructions. Secondary memory 220 and main memory 215 can include computer readable signals, in compressed or uncompressed form. Exemplary computer readable signals, whether modulated using a carrier or not, are signals that a computing system can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Figure 3:
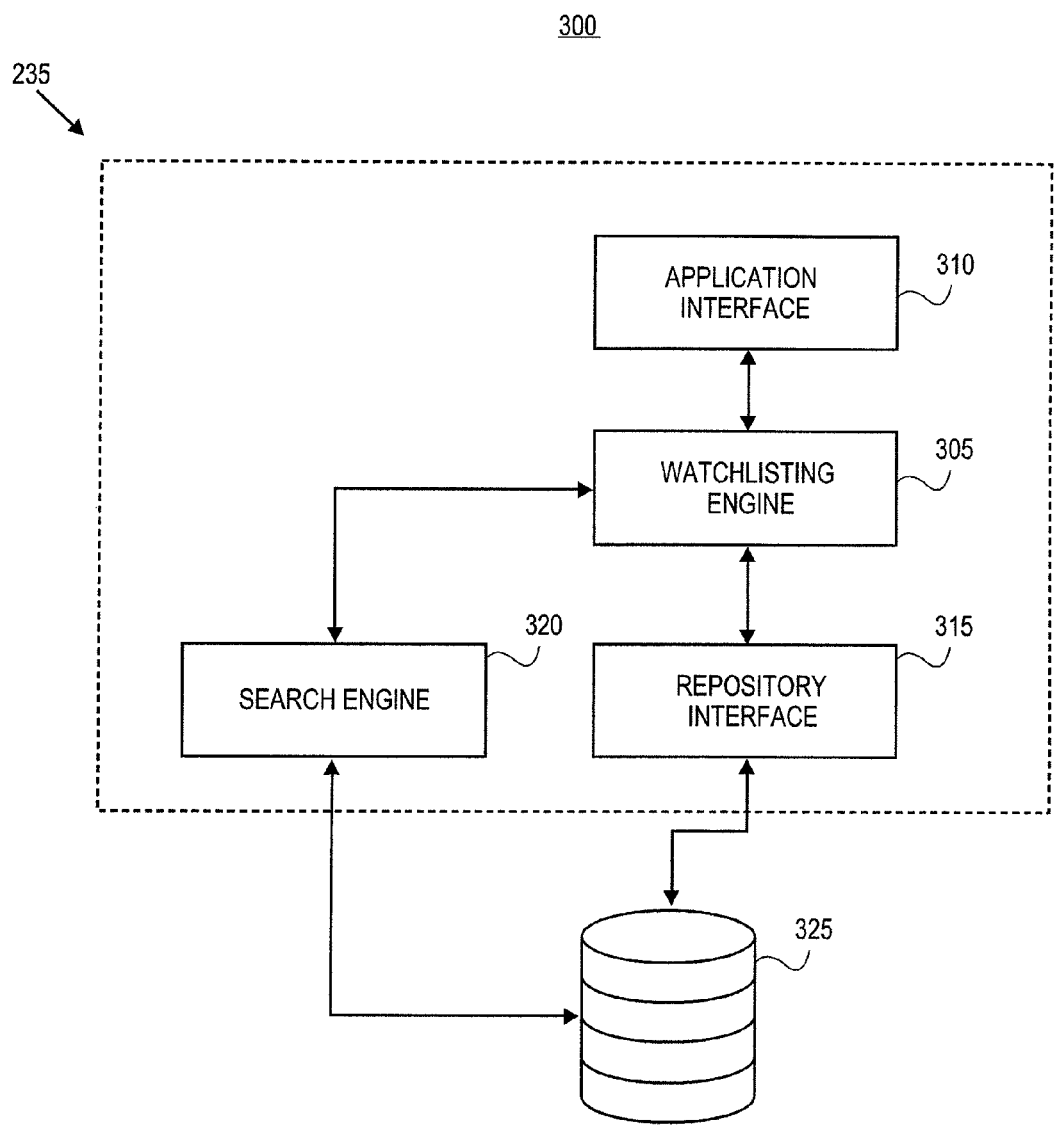
FIG. 3 is a diagram illustrating an exemplary watchlisting module consistent with embodiments of the present disclosure.

FIG. 3 depicts a more detailed block diagram 300 of watchlisting module 225 in accordance with a further exemplary embodiment. It should be readily apparent to those of ordinary skill in the art that the diagram depicted in FIG. 3 represents a generalized schematic illustration and that other components may be added or existing components may be removed or modified.

As shown in FIG. 3, watchlisting module 225 can include a watchlisting engine 305, an application interface 310, a repository interface 315, and a search engine 320. Modules 305-320 of watchlisting module can be implemented as software components, hardware components or combinations thereof. More particularly, modules 305-320 can be implemented using conventional programming languages (e.g., Pascal, FORTRAN, etc.), objected oriented programming languages (e.g., C++), Java, PHP, Perl, XML or other similar languages. Modules 305-320 can also be implemented as hardware components such as an application specific integrated circuit, a programmable read-only memory, an EEPROM, a microcontroller, a microprocessor or other similar computing platform.

Watchlisting module 225 can be coupled to a repository 325. Repository 325 can be implemented in any structure such as a database. For example, repository 325 can be implemented utilizing any type of conventional database architecture using open source technologies, proprietary technologies, or combinations thereof. Repository 325 can be configured to store information captured and managed by watchlisting module 225.

Watchlisting engine 305 can be configured to manage modules 310-320 to provide the functionality of watchlisting module 225 as previously described and further described herein below. In particular, watchlisting engine 305 is configured to receive information about entities. Watchlisting engine 305 is configured to take the received data and arrange the received data in a secure watchlist. Watchlisting engine 305 is configured to manage the watchlist in order to allow a user to interact with the watchlist. Watchlisting engine 305 is further configured to store the secure watchlist in repository 325. Additionally, watchlisting engine 305 is configured receive requests to retrieve information from the watchlist and, in response, retrieve the information.

Watchlisting engine 305 classifies information about entities into secure watchlists. A watchlist is a data structure for holding information about entities. The watchlist defines a category in which the entities are to be classified. The watchlist allows users to track entities associated with the category. For example, watchlisting engine 305 can be configured to generate a watchlist to enter information about suspected terrorists. As such the watchlist can be populated by users of watchlisting module 235 with entities suspected to be terrorists. Further, users can retrieve information from the watchlist to identify and track entities that may be suspected terrorists.

Figure 4:
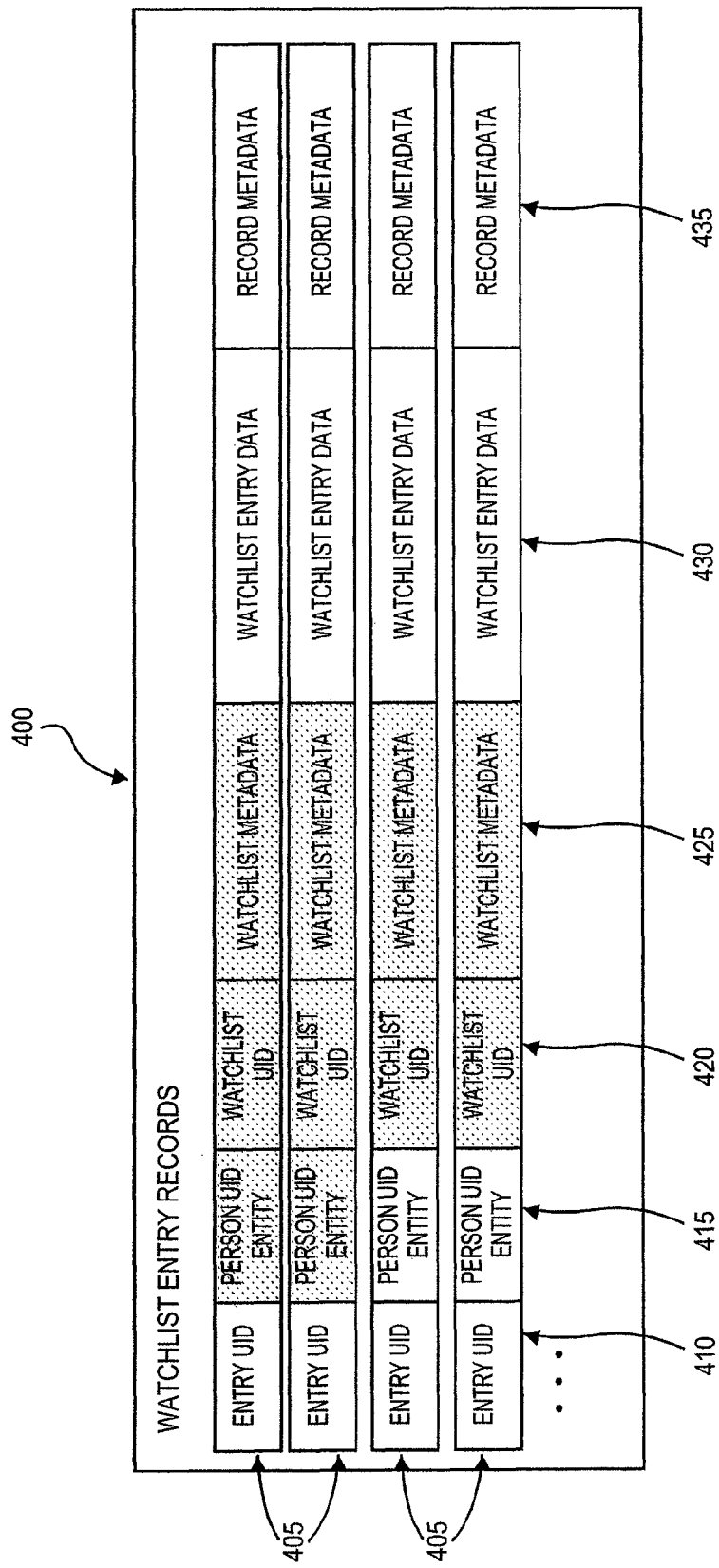
FIG. 4 is a diagram illustrating an exemplary watchlist data structure consistent with embodiments of the present disclosure.

According to embodiments, watchlisting engine 305 is configured to generate watchlists that consist of the collection of watchlist entries. Each watchlist entry encapsulates all the information about an entity to be tracked by the watchlist. FIG. 4 is a generalized diagram illustrating a watchlist 400 according to embodiments. As illustrated, watchlist 400 includes a number of watchlist entries 405. While FIG. 4 illustrates four watchlist entries 405, one skilled in the art will realize that watchlist 400 can include any number of entries 405.

Watchlist entries 405 can include information fields for recording information about the entities to be included in watchlist 400. Watchlist entries 405 can include an entry unique identification field (UID) 410, a entity UID field 415, a watchlist UID field 420, a watchlist metadata field 425, a watchlist entry data field 430, and a record metadata field 435.

Entry UID field 410 contains a global unique identifier (GUID) that uniquely associates a particular watchlist entry 405 to watchlist 400. As such, watchlisting engine 335 can identify watchlist entries 405 associated with a particular watchlist 400.

Entity UID field 415 contains a global unique identifier (GUID) that uniquely identifies the entity for which information is included in watchlist entry 405. The entity GUID can be unique across different watchlists 400. As such, watchlisting engine 305 can identify and uniquely track the same entity across different watchlists 400.

Watchlist UID field 420 contains a global unique identifier (GUID) that uniquely identifies watchlist 400. As such, watchlisting engine 335 can store, track, and retrieve multiple watchlists 400.

Watchlist metadata field 425 contains metadata about watchlist 400. The metadata can include information about the creator/owner of watchlist 400, a title of watchlist 400, a description of watchlist 400, and password information for different membership processes associated with watchlist 400, such as nomination to watchlist 400, denial of membership to watchlist 400, approval of membership to watchlist 400, and removal from watchlist 400.

Watchlist entry data field 430 contains identifying information about the entity associated with a watchlist entry 405. The identifying information can include information that identifies and describes the entity, information describing the activities of the entity, threat level of the entity, and status of the entity. For example, the identifying information can be watchlist entry nominating activity, watchlist entry nominating activity's identity, watchlist entry nomination comments, watchlist entry nomination date-time, watchlist entry denying activity, watchlist entry denying activity's identity, watchlist entry denial comments, watchlist entry denial date-time, watchlist entry approving activity, watchlist entry approving activity's identity, watchlist entry approval comments, watchlist entry approval date-time, watchlist entry removing activity, watchlist entry removing activity's identity, watchlist entry removal comments, watchlist entry removal date-time, watchlist entry alert category, watchlist entry alert level, watchlist entry alert contact, watchlist entry alert details, watchlist entry alert region, watchlist entry state, and watchlist entry state lock.

Record metadata field 435 contains metadata required for maintenance of a watchlist entry 405. The metadata can include information about the computing system creating, storing, or maintaining the watchlist entry, the region in which the watchlist entry was created, and date and time the watchlist entry was created. The metadata allows computing systems in the different regions of system 100 to share, maintain, and consolidate watchlist entries from different computing systems. For example, the metadata can include a entry state, entry audit information, entry zone, entry subzone, entry classification, entry server time stamp, entry lastmodified time stamp, and record datecreated time stamp.

Returning to FIG. 2, watchlist engine 305 can be configured to control the creation of watchlist and entry of information into a watchlist. For example, for a watchlist 400, watchlisting engine 305 can be configured to access data in watchlist 400, to export data from watchlist 400, and to perform other managing processes for watchlist 400. Additionally, watchlisting engine 305 can be configured to create, manage, and control watchlist entries 405 for a watchlist 400. Watchlisting engine 305 can be configured to perform membership process for an individual watchlist entry 405 such as approving membership to the watchlist, removing membership to the watchlist, denying membership to the watchlist, nominating membership to the watchlist, or modifying alert information of an entry.

Each of the membership processes relates to the addition or modification of a watchlist entry 405. Nominating is a process of placing an entity in a watchlist entry. Approving is a process of confirming an entity is correctly included in a watchlist entry of a watchlist. Removing is a process of removing a watchlist entry from a watchlist. Denying is a process of tagging a watchlist entry as improperly included in a watchlist without removing the watchlist entry. Alert information consists of information defining a level of threat an entity poses and the reasons for the level of threat.

According to embodiments, watchlisting engine 305 can be configured to provide levels of access for the different membership processes associated with a watchlist 400. For example, each process such as nominating, approving, removing, denying can be limited to particular users based on a level of access. Watchlisting engine 305 can establish levels of access by allowing a creator/owner of a watchlist to associate passwords with each membership process. As such, watchlisting engine 305 can allow a user to perform the process based on a correct entry of a password. By establishing levels of access, the different membership processes can be limited to certain users to insure the integrity of the information in watchlist 400.

Watchlisting engine 305 is also configured to secure watchlist 400 from tampering. In order to secure a watchlist 400, watchlisting engine 305 creates a State Lock. The State Lock includes data from the watchlist, called the State Key, which is encrypted. The State Key can include, for example, the values of the data fields, GUID of the watchlist entry, the passwords for the membership process, and the like. By encrypting these values, the State Lock captures and secures the values of the watchlist entry itself, as well as the entity's status on the watchlist and the access controls, at a particular time.

Watchlisting engine 305 can be configured to utilize any type of symmetric or asymmetric encryption method to encrypt the State Key. For example, watchlisting engine can utilize the Advanced Encryption Standard (AES) to encrypt the State Key.

Watchlisting engine 305 can be configured to utilize the State Lock and the GUIDs to verify that the State Lock was applied (and still is associated) with the correct watchlist entry. For example, watchlisting engine 305 can decrypt the State Lock for an entry and compare the GUIDs of the State Lock to the GUIDs of the watchlist entry. Watchlisting 305 engine can be configured to utilize the State Lock to verify that the data in the entry have not been tampered with by comparing the encrypted State Lock data with the current State Key. For example, watchlisting entry 305 can decrypt the State Lock and compare the decrypted State Lock with the State Key of the entry. Watchlisting engine 305 can be configured to utilize the State Lock to secure the access controls from tampering. For example, watchlisting engine 305 can encrypt the passwords in the State Lock. Additionally, watchlisting engine 305 can verify the passwords by comparing encrypted passwords with entered or stored passwords.

According to embodiments, watchlisting module 235 can be configured to maintain the keys for encryption and decryption of the State Key. Likewise, an application 230, such as BAT, can maintain the keys for encryption and decryption. As such, watchlisting module 235 or application 230 can utilize the encryption key to create the State Lock by encrypting the State Key. Watchlisting module 235 or application 230 can utilize the decryption key to decrypt the State Lock. Once the decrypted, watchlisting module 235 or application 230 can use the decrypted State Lock to check the integrity of the data, repair the data if it had been directly tampered (as long as the State Lock's GUIDs matched the Entry's GUIDs, indicating that the lock itself wasn't tampered with or swapped), and prompt the user for access information for membership processes.

In order to allow user to interact with watchlisting module 235, watchlisting engine 305 can be coupled to application interface 310. Application interface 310 can be configured to generate user interfaces for creating, managing, and modifying watchlists, such as watchlist 400. Application interface 310 can be configured to generate user interfaces including widgets, text fields, and the like that allow a user to interact with watchlisting engine 305 to perform the processes associated with a watchlist.

If watchlisting module 235 is implemented in a stand alone application, application interface 310 can be configured to generate the user interfaces on execution of the stand alone application. If watchlisting module 235 is implemented in another security application such as BAT, application interface 310 can be configured to generate the user interfaces on initiation of a request from the security application. The security application can generate the request based on a selection of a widget in the security application.

In order to create a new watchlist, add new watchlist entries to watchlist, view a watchlist, and modify watchlist entries in an existing watchlist, application interface 310 can be configured to generate a manager user interface. The manager user interface can include text fields that allow a user to select an existing watchlist. Manager user interface can include widgets that allow a user to initiate a new watchlist creation process or to select an existing watchlist to view and modify.

Figure 5:
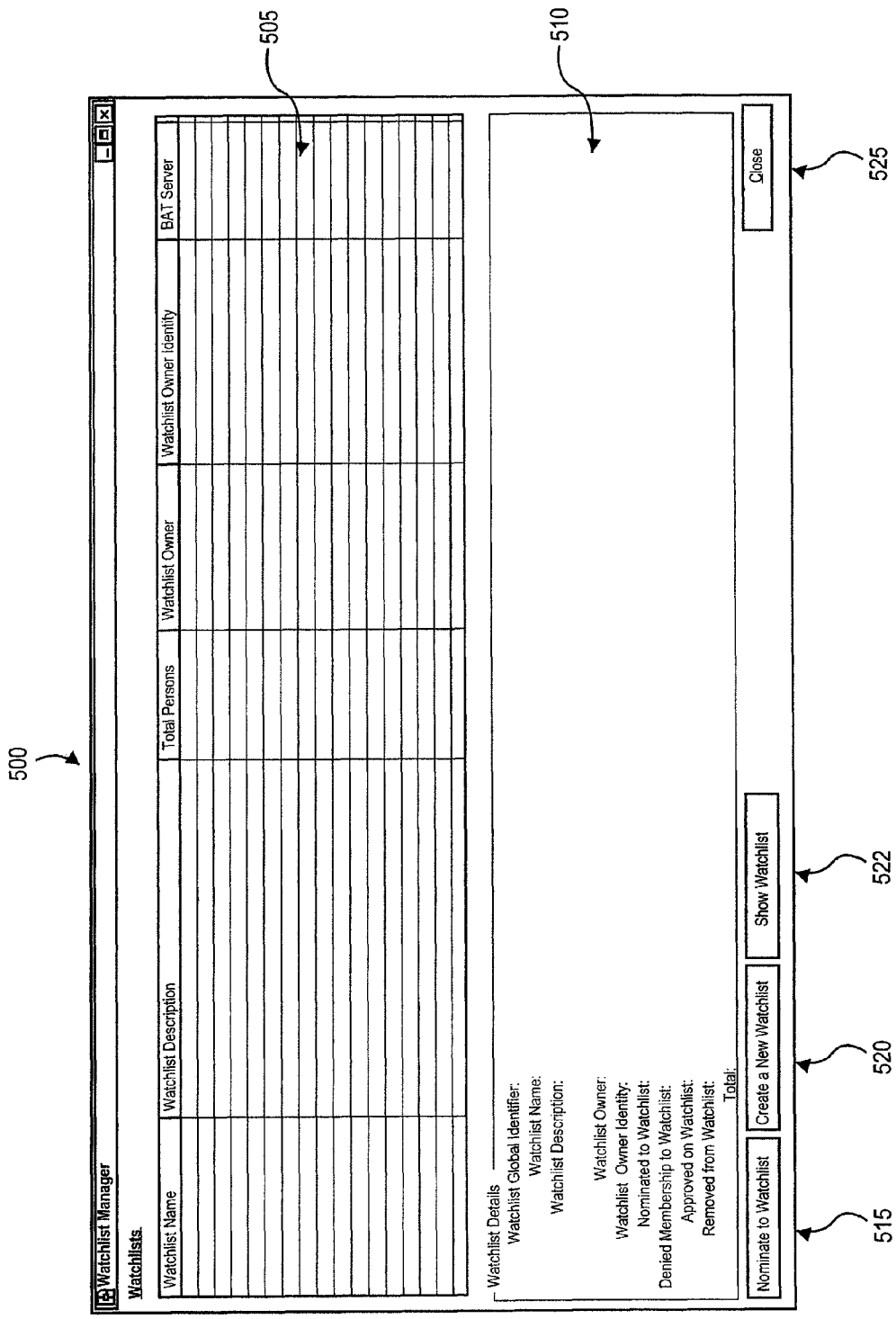
FIG. 5 is a diagram illustrating an exemplary manager user interface consistent with embodiments of the present disclosure.

FIG. 5 is a generalized diagram illustrating a manager user interface 500 consistent with embodiments of the disclosure. It should be readily apparent to those of ordinary skill in the art that the diagram depicted in FIG. 5 represents a generalized schematic illustration and that other components may be added or existing components may be removed or modified.

As illustrated in FIG. 5, interface 500 can include a watchlist text field 505, a watchlist details field 510, a nominate button 515, a create button 520, and show button 522. Interface 500 can also include a close button 525. A user can utilize close button 525 to close interface 500. Watchlist text field 505 can be configured to display a list of watchlists maintained by watchlisting module 235. Watchlist text field 505 can also be configured to include a snapshot of details about the watchlists. For example, watchlist text field 505 can include information such as watchlist name, watchlist description, total number of entities in the watchlist, watchlist owner, watchlist owner identity, and BAT server (if watchlisting module 235 is incorporated in a BAT application).

Watchlist text field 505 can also be configured to be interactive. A user can highlight one of the watchlists displayed in watchlist text field 505. In response, watchlisting engine 305 can retrieve details about the highlighted watchlist and display the details in watchlist details field 510. Watchlist details field 510 can include information such as watchlist GUID, watchlist name, watchlist description, total number of entities in the watchlist, watchlist owner, watchlist owner identity, a number of entities to nominated to the watchlist, a number of entities denied membership to the watchlist, a number of entities approved on the watchlist, and a number of removed from the watchlist.

Additionally, once a watchlist is highlighted in watchlist text field 505, a user can utilize nominate button 515 to nominate an entity to the highlighted watchlist. Once selected nominate button 515 has been selected, application interface 310 can be configured to generate nominate user interfaces that allow the user to enter information for the watchlist entry. Nominate user interfaces can include text fields that allow a user to enter information to populate a watchlist entry 405. Nominate user interface can include widgets that allow a user to transmit the information to watchlisting engine 305 in order to organize and store the entered information.

Additionally, if the nominate process is access controlled, application interface 310 can generate an interface for entering access control information such as a password. Application interface 310 can pass the access control information to watchlisting engine 305 for verification before allowing a user to perform the nomination membership process.

Figure 6A:
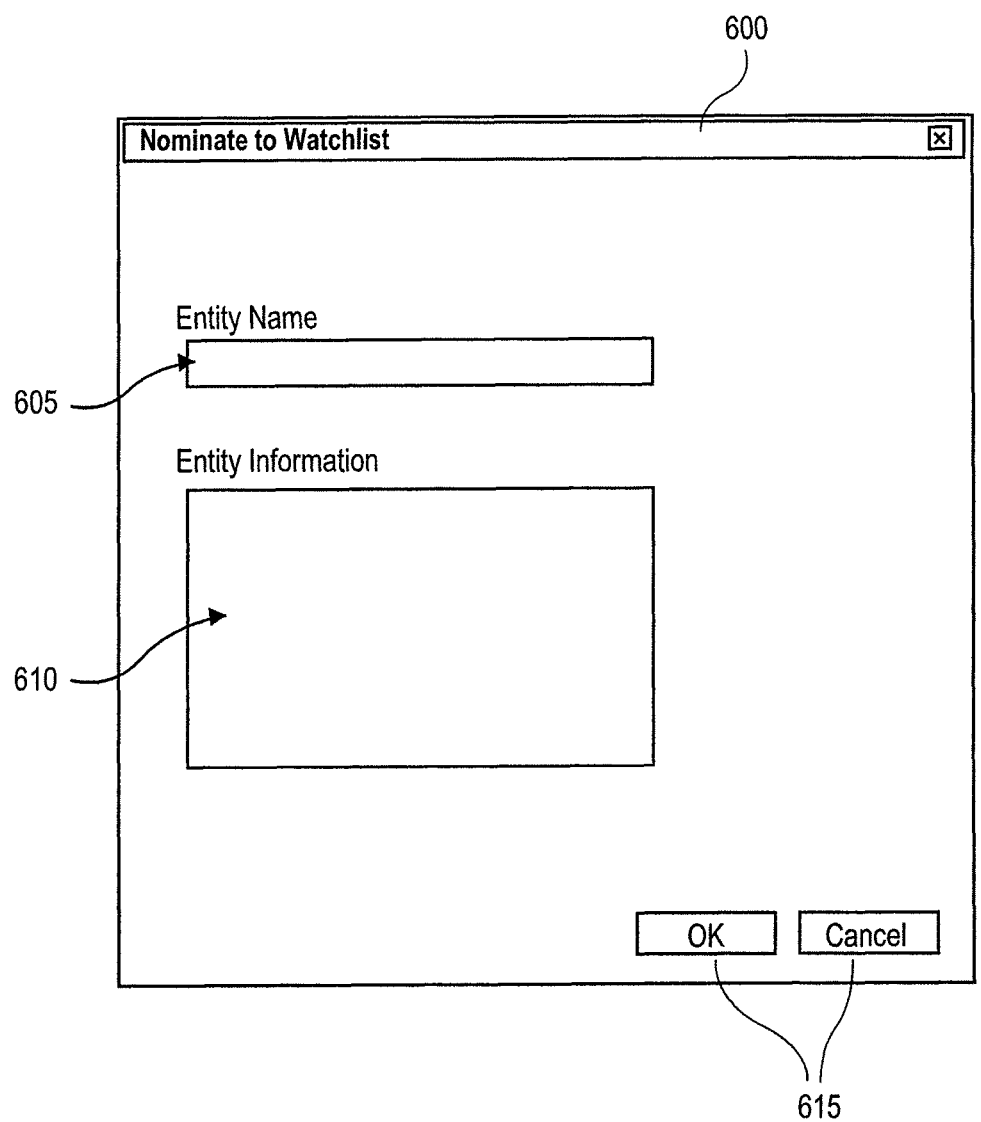
FIGS. 6A and 6B are diagrams illustrating exemplary nominate user interfaces consistent with embodiments of the present disclosure.
Figure 6B:
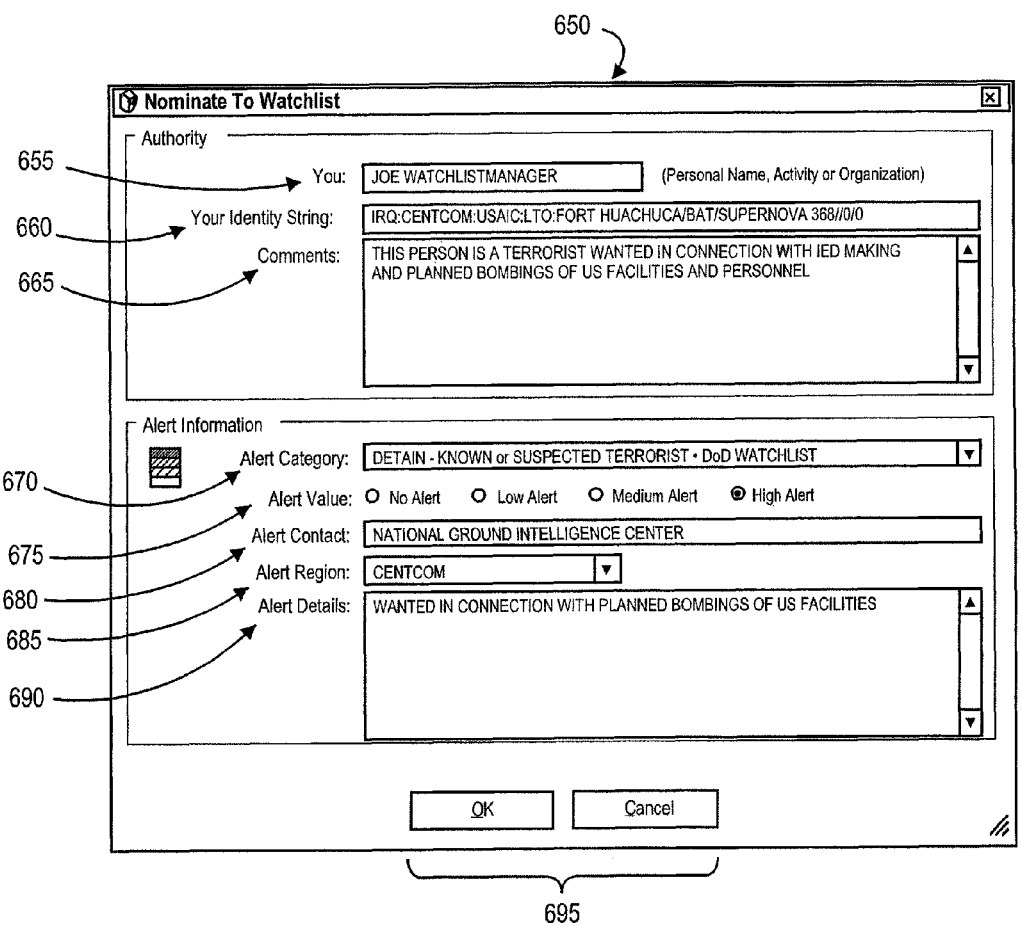

FIGS. 6A and 6B are generalized diagrams illustrating nominate user interfaces 600 and 650 consistent with embodiments of the disclosure. It should be readily apparent to those of ordinary skill in the art that the diagrams depicted in FIGS. 6A and 6B represents generalized schematic illustrations and that other components may be added or existing components may be removed or modified.

As illustrated in FIG. 6A, nominate user interface 600 can include an entity name text field 605, entity information text field 610, and confirmation buttons 615. Entity name text field 605 is configured to allow a user to enter a name of entity to be nominated to a watchlist entry 405. Entity information text field 610 is configured to allow a user to enter information about the entity to be nominated. For example, the information can include residence information, citizenship, known alias, and the like. Confirmation buttons 615 allow the user to transmit the information to watchlisting engine 305 or cancel the nominate process.

As illustrated in FIG. 6B, after entering information in interface 600, application interface 310 can be configured to generate a nominate user interface 650 to allow a user to enter information about themselves and alert information about the entity in the watchlist entry. For example, to enter information about the user, interface 650 can be configured to include a user text field 655, user identity string 660, and comments text field 665. To enter information about the alert status, interface 650 can be configured to include an alert category menu 670, alert value widget 675, alert contact text field 680, alert region menu 685, and alert comments text field 690. Interface 650 can also be configured to include confirmation buttons 695. Confirmation buttons 695 allow the user to transmit the information to watchlisting engine 305 or cancel the nominate membership process.

In addition to receiving information from an interface about an entity, watchlisting module 235 can be configured to receive information about entities directly from application 230 or other applications in communication with watchlisting module 235. For example, watchlisting module 235 can be a component of a BAT application. As such, watchlisting module 235 can receive information about an entity directly from the BAT application when nominating an entity to the watchlist.

Returning to FIG. 5, once a watchlist is highlighted in watchlist text field 505, a user can utilized show button 522 to view the highlighted watchlist. Once show button 522 has been selected, application interface 310 can be configured to generate a show watchlist user interfaces that allows the user to view the watchlist and manage watchlist entries in the highlighted watchlist. Show watchlist interface can include text fields that allow a user view the watchlist entries in the watchlist. Show watchlist user interface can include widgets that allow a user to perform membership process such as deny, approve and remove membership of entities in the watch and to change the alert status of entities in the watchlist.

Figure 7:
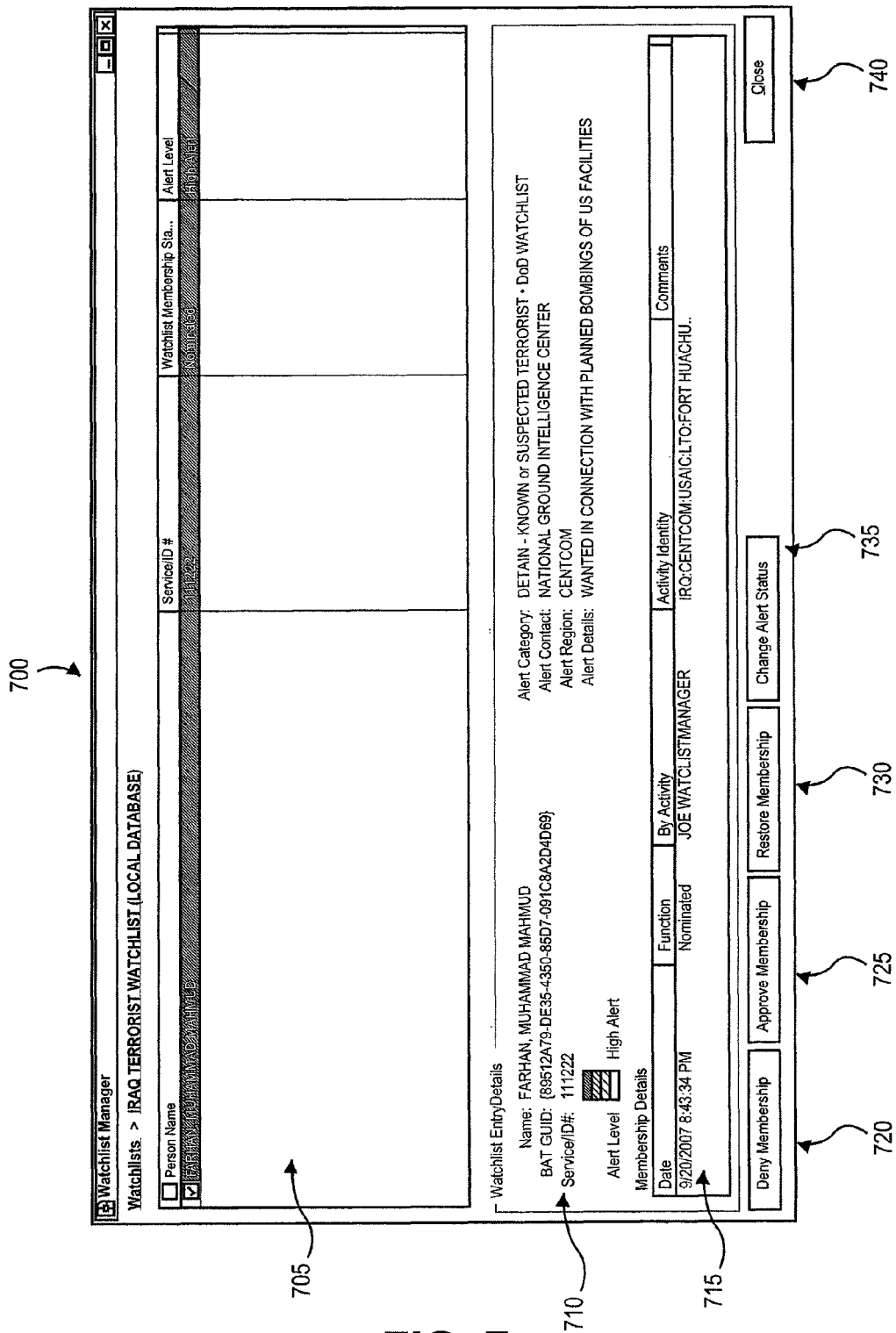
FIG. 7 is a diagram illustrating an exemplary viewing user interface consistent with embodiments of the present disclosure.

FIG. 7 is a generalized diagram illustrating a show watchlist interface 700 consistent with embodiments of the disclosure. It should be readily apparent to those of ordinary skill in the art that the diagram depicted in FIG. 7 represents generalized schematic illustration and that other components may be added or existing components may be removed or modified.

As illustrated in FIG. 7, interface 700 can include a entity text field 705, an entry details text field 710, membership text field 715, a deny membership button 720, approve membership button 725, a remove membership button 730, a change alert status button 735, and close button 740. Close button 740 allows the user to close interface 700. Entity text field 705 can be configured to display all the entities included in the watchlist. Entity text field 705 can be configured to be interactive to allow a user to select an entity in the watchlist.

Once selected, interface 700 can be configured to display details about the entry in entry details text field 710 and membership details text field 715. Entry details text field 710 can be configured to display information about the entity selected in entity text field 705. For example, entry details text field 710 can be configured to display an entity's name, entity's GUID, and alert information. Membership details text field 715 can be configured to display information about the membership process performed on a particular entity. For example, membership details text field 715 can display information such as a particular membership process, such as nominate, date performed, user performing membership process, and comments.

Additionally, once an entity has been selected, a user can utilize buttons 720, 725, 730, and 735 to perform membership process on the selected entity. Once one of buttons 720, 725, 730, and 735 has been selected, application interface 310 can be configured to generate membership user interfaces that allow the user to perform the membership processes. Membership user interfaces can include text fields that allow a user to enter information to define a particular membership process. Membership user interfaces can include widgets that allow a user to transmit the membership information to watchlisting engine 305 to organize and store the entered information.

Figure 8A:
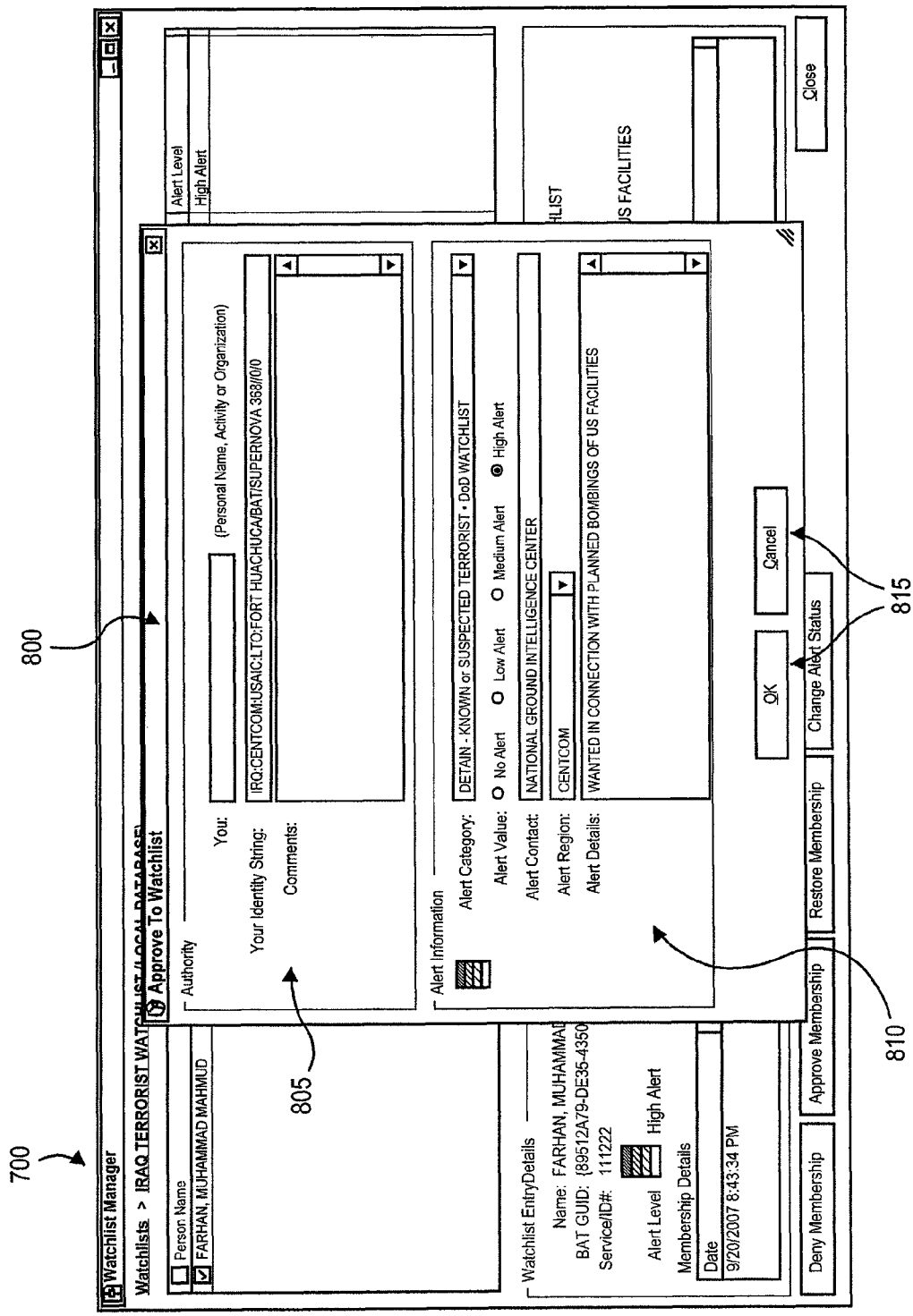
Figure 8B:
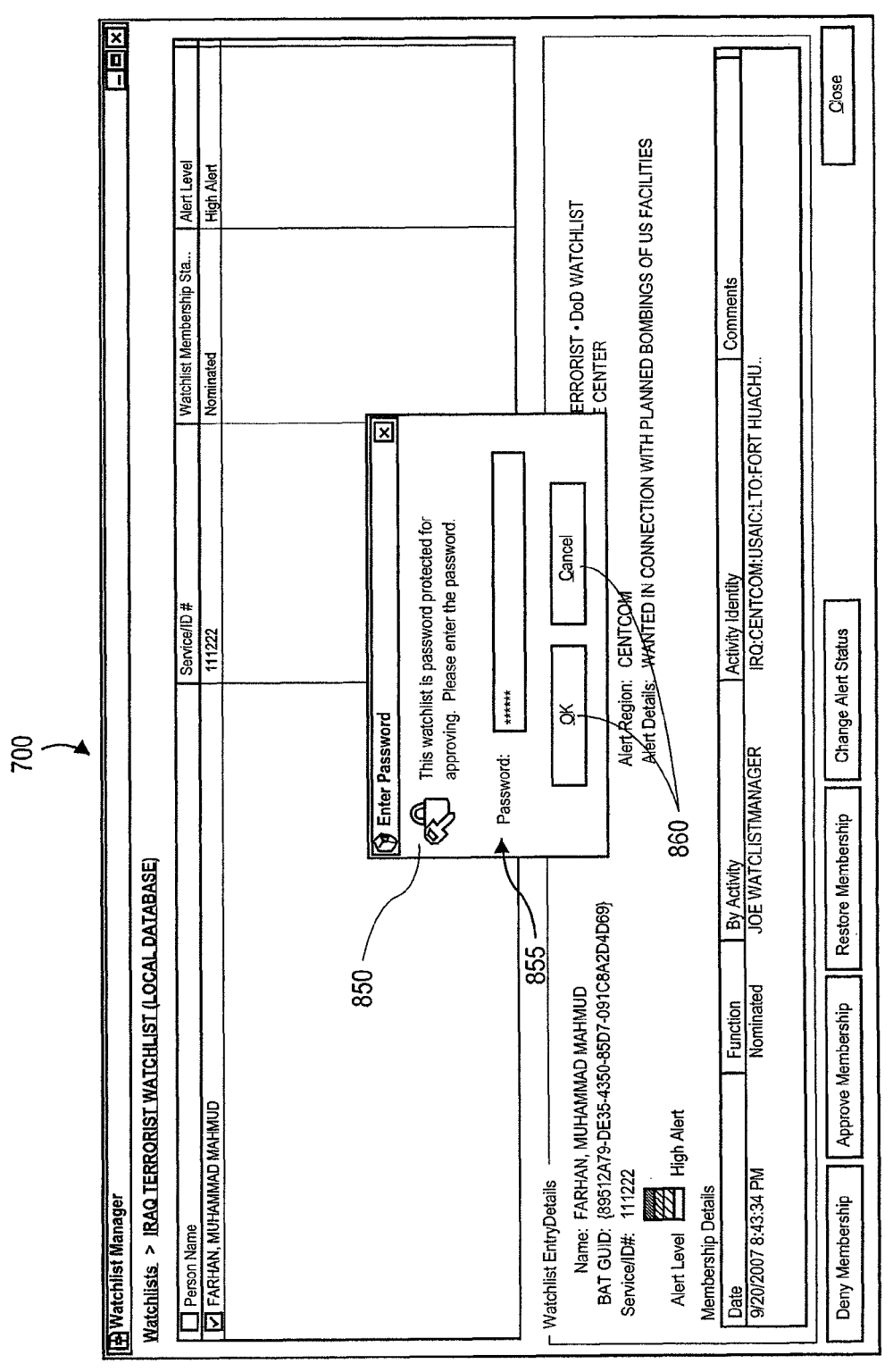

For example, if a user desires to perform an approve membership process, the user can select approve membership button 725. In response, application interface 310 can generate approve membership user interfaces. FIGS. 8A and 8B are generalized diagrams illustrating exemplary approve membership user interfaces 800 and 850 consistent with embodiments of the disclosure. It should be readily apparent to those of ordinary skill in the art that the diagrams depicted in FIGS. 8A and 8B represent generalized schematic illustrations and that other components may be added or existing components may be removed or modified.

As illustrated in FIG. 8A, approve membership user interface 800 includes an authority text field 805, an alert information text field 810, and confirmation text field 815. Authority text field 805 can be configured to include text field to allow a user to information to identify themselves. For example, text field 805 can include text fields for entering information such as name, identity string, and comments.

Alert information text field 810 can be configured to include text fields and menus to allow the user to modify the alert information of the watchlist entry. For example text field 810 can be configured to include text fields and menus for entering information such as alert category, alert value, alert contact, alert region, and alert comments. Once the information has been entered, confirmation buttons 815 can be selected to either accept or cancel the approve membership process.

According to embodiments of the present disclosure, watchlisting module 335 can be configured to provide access controls on the various membership processes. For example, watchlisting module 335 can maintain passwords for the various membership processes. In order to provide access control, application interface 310 can generate user interfaces to allow a user to enter access information when a membership process is performed.

As illustrated in FIG. 8B, if access controls have been established for the approve membership process, after selection of confirmation buttons 815, application interface 310 can generate an access user interface 850. Interface 850 can be configured to include an access control text field 855 and access confirmation buttons 860. Access control text field 855 can be configured to allow the user to enter a password for the particular membership process, in this case, approve process. Once the password has been entered, confirmation buttons 815 can be selected to either transfer the access information to watchlisting engine 305 or cancel the access control.

When a user enters access control information, watchlisting engine 305 can be configured to retrieve stored access information and compare the access information to entered access information.

Returning to FIG. 5, manager interface 500 can include a create button 520. A user can select button 520 in order to initiate a new watchlist creation process. In response to the selection of button 520, application interface 310 can be configured to generate a new watchlist interface to allow the user to enter information about the watchlist. The new watchlist interface can be configured to include text fields to enter descriptive information about the new watchlist. The new watchlist interface can also be configured to include widgets, menus and text fields to establish access controls for the membership processes.

Figure 9:
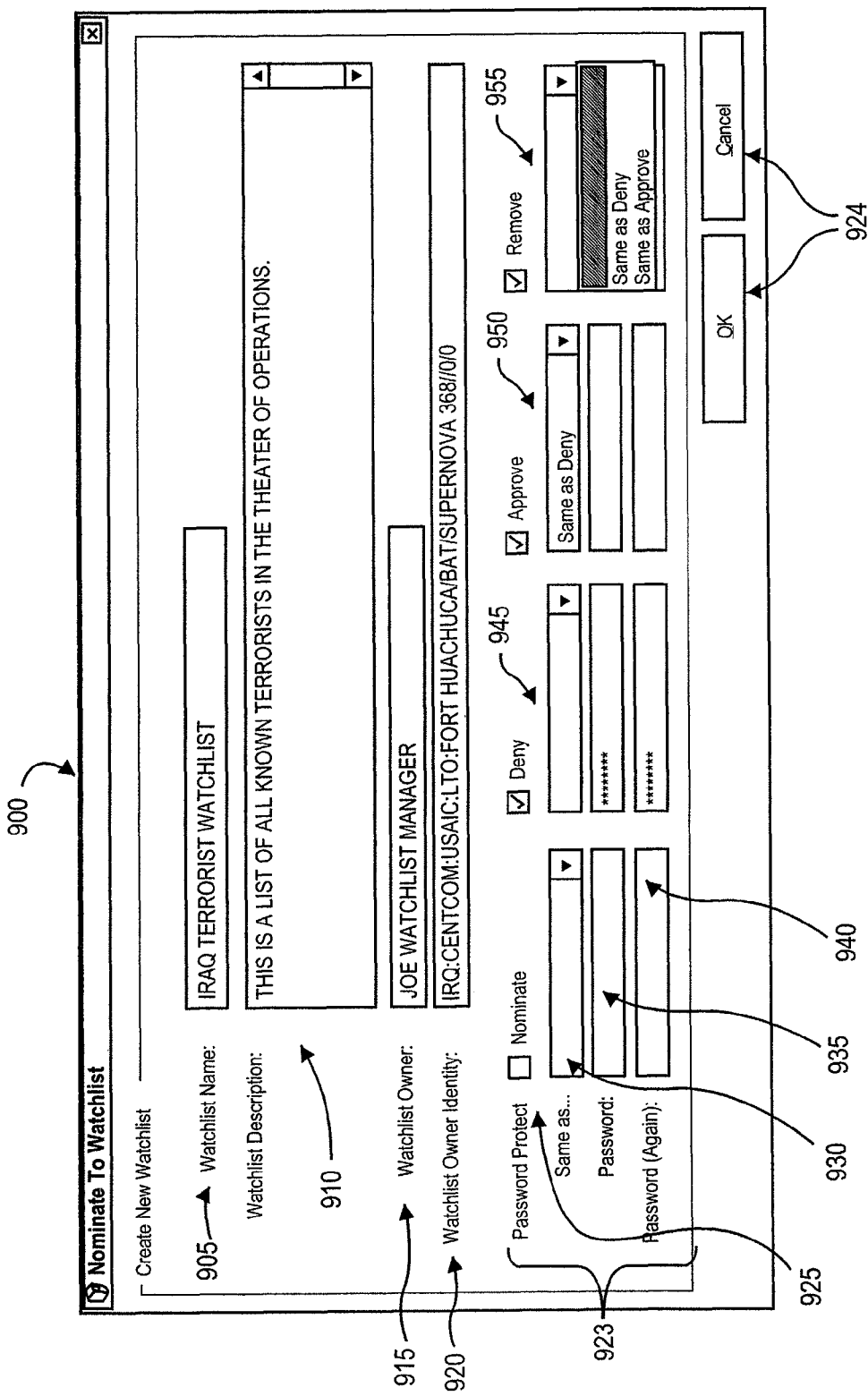
FIG. 9 is a diagram illustrating an exemplary creation user interface consistent with embodiments of the present disclosure.

FIG. 9 is a generalized diagram illustrating a create watchlist interface 900 consistent with embodiments of the disclosure. It should be readily apparent to those of ordinary skill in the art that the diagram depicted in FIG. 9 represents generalized schematic illustration and that other components may be added or existing components may be removed or modified.

As illustrated in FIG. 9, interface 900 can include watchlist name text field 905, watchlist description text field 910, watchlist owner text field 915, watchlist owner identity text field 920, membership process section 923, and confirmation buttons 924. Watchlist name text field 905 can be configured to allow the user to enter a name for the new watchlist. Watchlist description text field 910 can be configured to allow the user to enter a description of the watchlist. Watchlist owner text field 915 and watchlist owner identity text field 920 can be configured to allow the user to enter a name and identification information, respectively.

Additionally, interface 900 can include membership process sections 923. Membership process sections 923 can be configured to include text fields, menus and widgets to allow the user to specify access control rules for the membership process: nominate, deny, approve, and remove.

For example, as illustrated, interface 900 can include a process section 929 for the nominate membership process. Process section 924 can include a widget 925 to select password protect for the nominate membership process. Widget 925 can be configured to allow the user to enter password information for the nominate membership process when selected. As such, interface 900 can include a same as menu 930, password text field 935, and repeat password text field 940. If the user selects widget 925, the user can specify the password for the nominate membership process to be the same as another membership process by using menu 930. Alternatively, the user can enter a separate password for the nominate membership process in password text field 935 and repeat password text field 940.

As with the nominate membership process, membership process sections 923 can include deny process section 945 for deny membership process, approve process section 950 for approve membership process, and remove process section 955 for remove membership process to allow the user to specify access control for these membership processes.

The watchlist creation process also includes seeding a first person in the watchlist. As such, when a watchlist is created, application interface 310 can be configured to generate a nominate user interface, such as interfaces 600 and 650, as illustrated in FIGS. 6A and 6B. Additionally, when seeding the first person to a new watchlist, watchlisting module 235 can be configured to receive information directly from application 230 or other applications in communication with watchlisting module 235.

Returning to FIG. 2, watching module 235 can be configured to transmit the secure watchlists to other application. As such, watchling module 235 can be configured to secure the entire watchlists utilizing any type of well-known encryption process.

Figure 10:
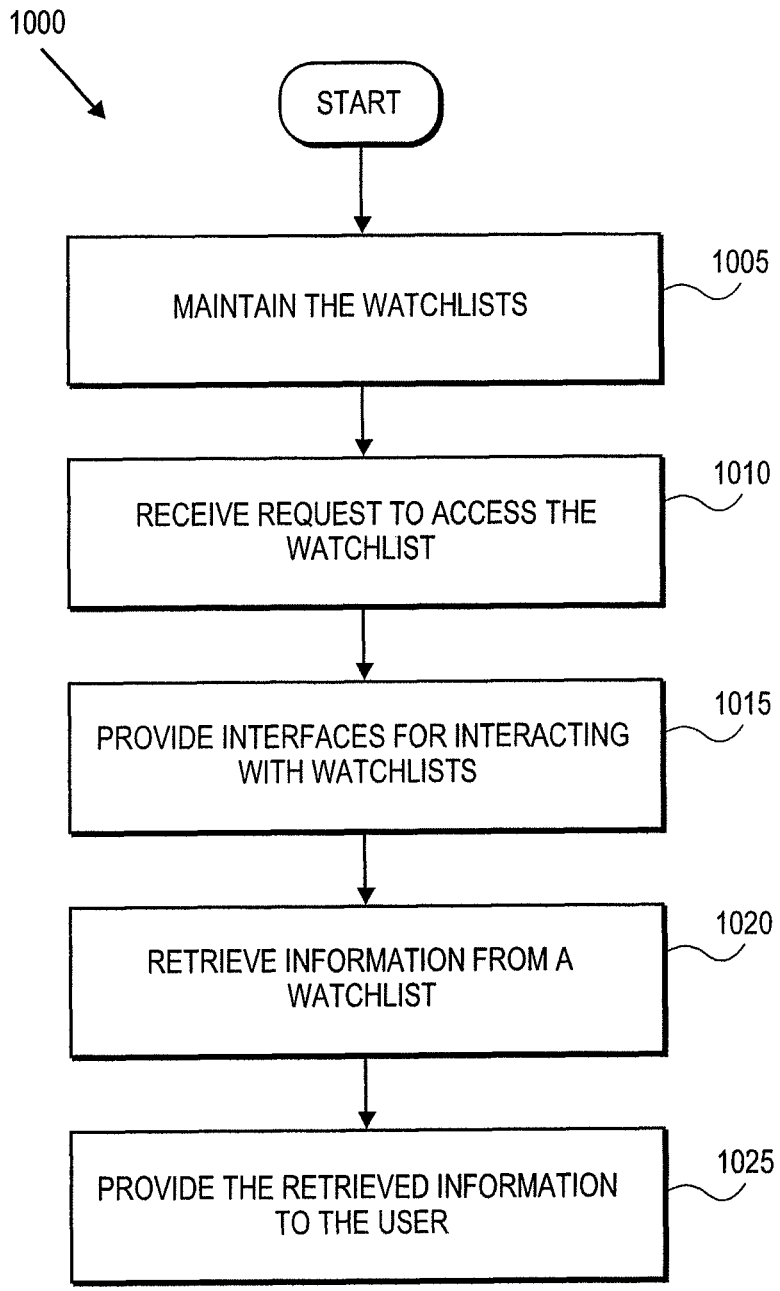
FIG. 10 is a diagram illustrating an exemplary process for managing watchlists consistent with embodiments of the present disclosure.

FIG. 10 is a flow diagram illustrating a process 1000 of maintaining and managing watchlists consistent with embodiments of the present disclosure. The process can be performed by computing systems in system 100 implementing an application including a watchlisting module as described above in FIGS. 1 through 9. It should be readily apparent to those of ordinary skill in the art that the diagram depicted in FIG. 10 represents a generalized illustration and that other steps may be added or existing steps can be removed or modified.

Process 1000 begins with watchlisting module 235 maintaining watchlist in a repository, in stage 1005. For example, watchlisting module 235 can store the watchlists in repository 325. Watchlisting module 235 can also be configured to manage the flow of information into and out of the watchlist. The watchlists include multiple watchlist entries. Each watchlist entry encapsulates all the information about an entity associated with the watchlist. For example, the watchlist entry can include information identifying an entity associated with the watchlist, GUID for uniquely identifying the watchlist, a GUID for uniquely identifying the watchlist entry, a GUID for uniquely identifying the entity, and access control information for controlling access to processes associated with the watchlist entries. Watchlisting module 235 can maintain the watchlist in a data structure as illustrated in FIG. 4.

By maintaining the watchlists, watchlisting module 235 can allow access to the watchlists. Watchlisting module 235 receives a request from a user to interact with a watchlist, in stage 1010. The request can be received from an application such as application 230.

Watchlisting module 235 provides interfaces for interacting with the watchlist, in stage 1015. The interfaces allow a user to interact with the watchlist such as view and modify the watchlist. For example, application interface 310 can generate interfaces as illustrated in FIGS. 5-9.

In response to user interaction with the interfaces, watchlisting module 235 retrieves information from the watchlist, in stage 1020. Then, watchlisting module 235 provides the information to the user, in stage 1025. For example, a user can select a watchlist displayed in watchlist text field 505 and select button 522 of interface 500. In response, watchlisting engine 305 can retrieve information about the selected watchlist from repository 325 and provide the information to application interface 310. Application interface 310 can generate an interface, such as interface 700, to present the information to the user.

Figure 11:
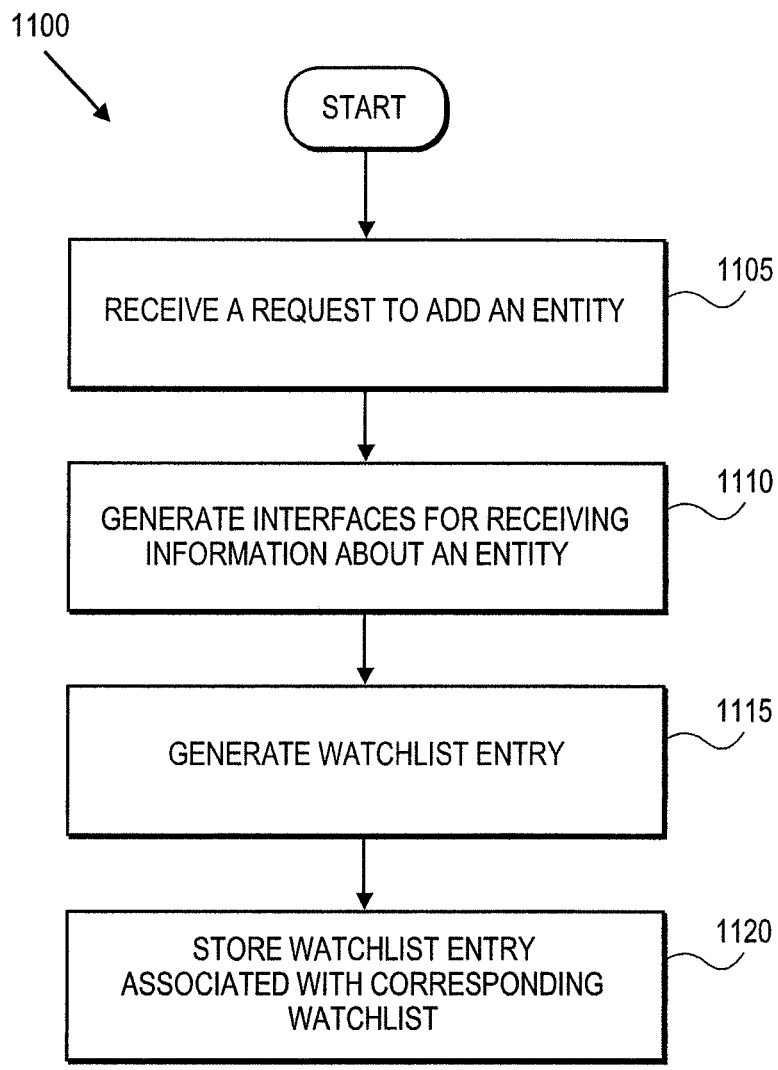
FIG. 11 is a diagram illustrating an exemplary process for adding an entity to a watchlist consistent with embodiments of the present disclosure.

By maintaining the watchlist, watchlisting module 235 also allows a user to add an entity to an existing watchlist. FIG. 11 is a flow diagram illustrating a process 1100 of adding an entity consistent with embodiments of the present disclosure. The process can be performed by computing systems in system 100 implementing an application including a watchlisting module as described above in FIG. 1 through 9. It should be readily apparent to those of ordinary skill in the art that the diagram depicted in FIG. 11 represents a generalized illustration and that other steps may be added or existing steps can be removed or modified.

Process 1100 begins with watchlisting module 235 receiving a request to add an entity to an existing watchlist, in stage 1105. The request can be received from an application such as application 230. Additionally, the request can be received in response to a widget being selected in an interface generated by watchlisting module 235.

Next, watchlisting module 235 generates interfaces for receiving information about an entity, in stage 1110. For example, application interface 310 can generate interfaces, such as interfaces 600 and 650 illustrated in FIGS. 6A and 6B, for receiving information about an entity. Additionally, watchlisting module 235 can receive information about an entity from an application, such as application 230.

Then, watchlisting module 235 generates a watchlist entry utilizing the received information, in stage 1115. For example, watchlisting engine 305 can organize the received information into a watchlist entry, such as watchlist entry 405 illustrated in FIG. 4.

Next, watchlisting module 235 can store the watchlist entry associated with the corresponding watchlist, in stage 1120. For example, watchlisting engine can store the watchlisting entry in repository 325.

Figure 12:
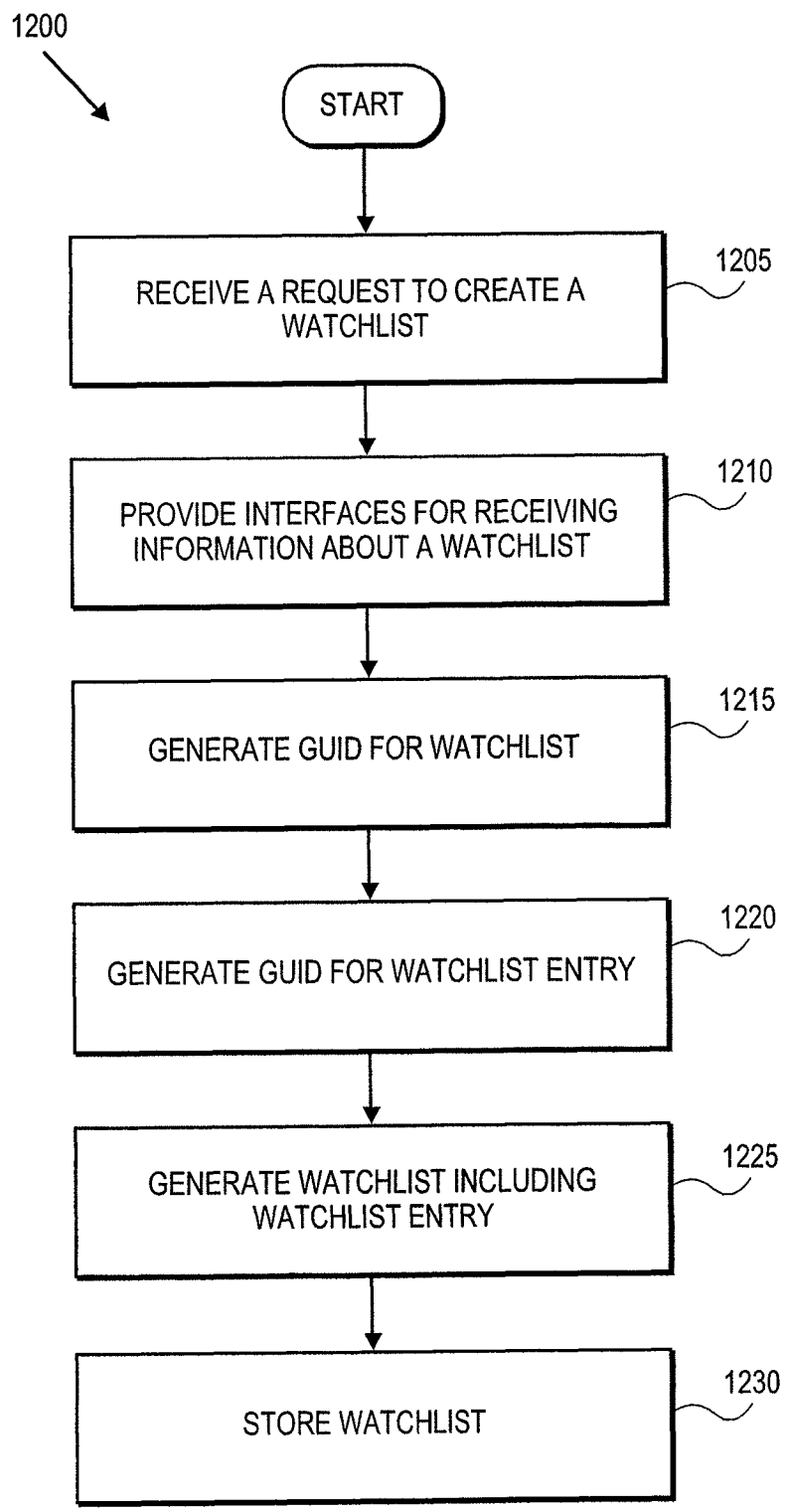
FIG. 12 is a diagram illustrating an exemplary process for creating a watchlist consistent with embodiments of the present disclosure.

In addition to maintaining the watchlists, watchlisting module 235 can be configured to create watchlists. FIG. 12 is a flow diagram illustrating a process 1200 of creating a watchlist consistent with embodiments of the present disclosure. The process can be performed by computing systems in system 100 implementing an application including a watchlisting module as described above in FIG. 1 through 9. It should be readily apparent to those of ordinary skill in the art that the diagram depicted in FIG. 12 represents a generalized illustration and that other steps may be added or existing steps can be removed or modified.

Process 1200 begins with watchlisting module 235 receiving a request from to create a watchlist, in stage 1205. The request can be received from an application, such as application 230. Additionally, the request can be received from a widget in an interface generated by application interface 310.

Then, watchlisting module 235 provides an interface to the user for entering information about the watchlist, in stage 1210. The information can include access control information for controlling access to processes associated with the watchlist. For example, under the command of watchlisting engine 305, application interface 310 can generate interfaces such as interface 900 as illustrated in FIG. 9.

After receiving information from the interface, watchlisting module 235 generates a GUID to uniquely identify the watchlist, in stage 1215. Additionally, watchlisting module 235 generates a GUID for uniquely identifying the entry for the entity in the watchlist, in stage 1220.

After receiving information, watchlisting module 235 generates a watchlist including a first watchlist entry, in stage 1125. The watchlist entry can include an identity of the first entity, the first unique identifier, the second unique identifier, a third unique identifier for identifying the first entity, and the access control information. A user can enter the identity of the first entity. Additionally, watchlisting module 235 can receive the identity of the first entity in the request. For example, the identity can be transmitted from an application such as a BAT application. Watchlisting module 235 can generate the third unique identifier. Likewise, watchlisting module 235 can also receive the third unique identifier from an application such as a BAT application.

After generating the watchlist, watchlisting module 235 stores the watchlist, in stage 1230. For example, watchlisting engine 305 can store the watchlist in repository 325.

Figure 13A:
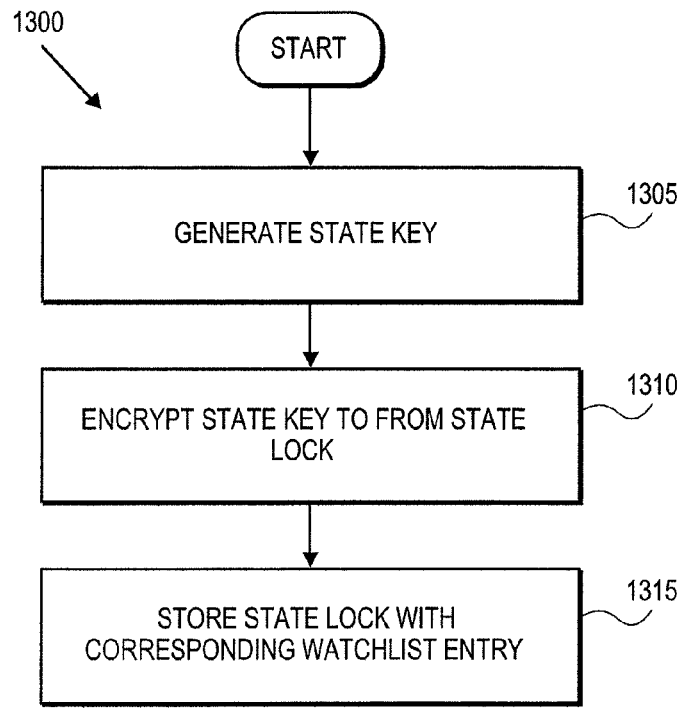
FIGS. 13A and 13B are diagrams illustrating exemplary processes for creating and utilizing a State Lock consistent with embodiment of the present disclosure.
Figure 13B:
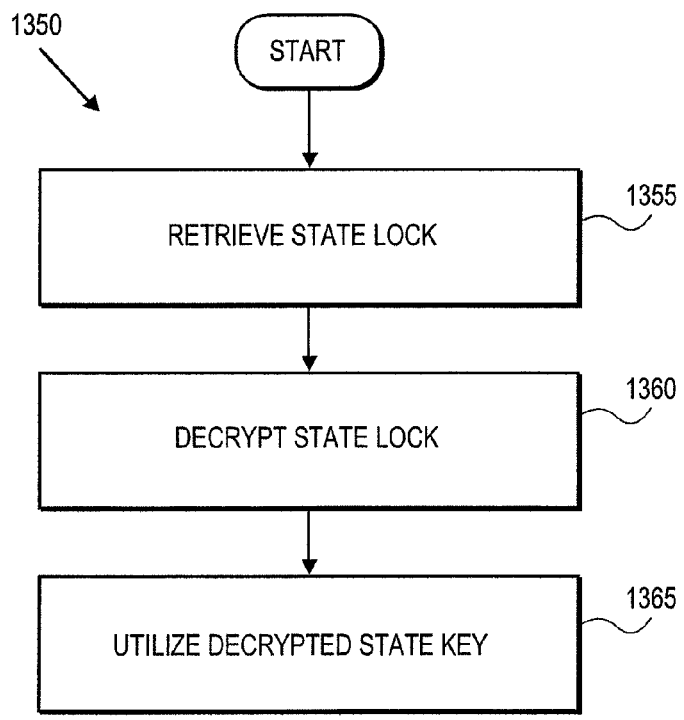

Watchlisting module provides a secure watchlist by including a State Lock with the watchlist entries. FIGS. 13A and 13B are flow diagrams illustrating a process 1300 of generating a State Lock and process 1350 for utilizing the State Lock consistent with embodiments of the present disclosure. The processes can be performed by computing systems in system 100 implementing an application including a watchlisting module as described above in FIG. 1 through 9. It should be readily apparent to those of ordinary skill in the art that the diagrams depicted in FIGS. 13A and 13B represent generalized illustrations and that other steps may be added or existing steps can be removed or modified.

Process 1300 begins with watchlisting module 235 generating the State Key, in stage 1305. The State Key can include different information from a particular watchlist entry. For example, the State Key can include the values of the data fields, GUIDs of the watchlist entry, the passwords for the membership processes, and the like. To generate the State Key, watchlisting engine 305 can retrieve the information from repository 325 and combine the information to form the State Key.

Next, watchlisting module 235 encrypts the State Key to form the State Lock, in stage 1310. For example, watchlisting engine 305 can encrypt the State Key utilizing any type of well-known encryption process, such as symmetric and asymmetric encryption processes.

Then, watchlisting module 235 can store the State Lock with the watchlist entry for which it was generated, in stage 1315. For example, watchlisting engine 235 can store the State Lock in watchlist entry data field 430 as illustrated in FIG. 4.

At any time, watchlisting module 235 can utilize the State Lock to verify the watchlist entry, repair the watchlist entry, or retrieve access control information. FIG. 13B shows a process 1350 for utilizing the State Lock. Process 1350 begins with watchlisting module 235 retrieving the State Lock, in stage 1355. For example, watchlisting engine 305 can retrieve the State Lock from watchlist entry data field 430 of a particular watchlist entry.

Next, watchlisting module 235 decrypts the State Lock to retrieve the State Key, in stage 1360. For example, watchlisting engine 305 can decrypt the State Lock utilizing any type of well-known decryption process, such as symmetric and asymmetric decryption process.

Then, watchlisting module 235 can utilize the State Lock to verify the watchlist entry, repair the watchlist entry, and/or retrieve access control information. Watchlisting engine 305 can be configured to utilize the State Lock and the GUIDs to verify that the State Lock was applied (and still is associated) with the correct watchlist entry. For example, watchlisting engine 305 can decrypt the State Lock for an entry and compare the GUIDs of the State Lock to the GUIDs of the watchlist entry. Watchlisting 305 engine can be configured to utilize the State Lock to verify that the data in the entry have not been tampered with by comparing the encrypted State Lock data with the current State Key. For example, watchlisting entry 305 can decrypt the State Lock and compare the decrypted State Lock with the State Key of the entry. Watchlisting engine 305 can be configured to utilize the State Lock to secure the access controls from tampering. For example, watchlisting engine 305 can encrypt the passwords in the State Lock. Additionally, watchlisting engine 305 can verify the passwords by comparing encrypted passwords with entered or stored passwords.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for tracking entities, comprising:
   receiving a request to create a watchlist including an entity associated with the watchlist;
   providing an interface for entering information about the watchlist, the information comprising access control information for controlling access to processes associated with the watchlist;
   generating a first unique identifier for identifying the watchlist; generating a second unique identifier for identifying a watchlist entry; generating the watchlist including the watchlist entry, the watchlist entry comprising an identity of the entity, the first unique identifier, the second unique identifier, a third unique identifier for identifying the entity, and the access control information;
   storing the generated watchlist;
   generating a state key for the watchlist entry, the state key comprising the first unique identifier, the second unique identifier, the third unique identifier, and the access control information; and
   encrypting the state key to generate a state lock.

2. The method of claim 1, wherein the request comprises the identity of the entity, the third unique identifier, and a threat posed by the entity.

3. The method of claim 1, wherein the processes associated with the watchlist comprise nominating membership of entities to the watchlist, approving membership of entities to the watchlist, denying membership of entities to the watchlist, and removing membership of entities to the watchlist.

4. The method of claim 3, wherein the access information comprises at least one password for at least one process.

5. The method of claim 1, wherein the watchlist further comprise information about the creator of the watchlist.

6. The method of claim 1, wherein encrypting the state key comprises:
   performing a symmetric encryption process on the state key to generate the state lock.

7. A method for tracking entities, comprising:
   maintaining at least one watchlist in a repository, the at least one watchlist comprising a plurality of watchlist entities, wherein each watchlist entry of the plurality of watchlist entries comprises an identity of an entity associated with the watchlist, a first unique identifier for identifying the at least one watchlist, a second unique identifier for identifying the watchlist entry, a third unique identifier for identifying the entity, and access control information for controlling access to processes associated with each of the plurality of watchlist entries;
   providing interfaces for interacting with the at least one watchlist, wherein the interfaces allow a user to interact with the at least one watchlist;
   retrieving information from the at least one watchlist in the repository in response to user interaction with the interfaces; and
   providing the retrieved information to the user;
   wherein maintaining the at least one watchlist, comprises:
      generating a state key for at least one watchlist entry, the state key comprising a first unique identifier for identifying the at least one watchlist, a second unique identifier for identifying the at least one watchlist entry, a third unique identifier for identifying a stored entity associated with the at least one watchlist entry, and access control information for controlling access to processes associated with the at least one watchlist entry; and
      encrypting the state key to generate a state lock.

8. The method of claim 7, wherein encrypting the state key comprises:
   performing a symmetric encryption process on the state key to generate the state lock.

9. The method of claim 7, wherein maintaining the watchlist further comprises:
- decrypting the state lock to retrieve the state key; and comparing the state key to the at least one watchlist entry.

10. The method of claim 7, wherein the processes associated with the at least one watchlist comprise nominating membership of entities to the at least one watchlist, approving membership of entities to the at least one watchlist, denying membership of entities to the at least one watchlist, and removing membership of entities from the at least one watchlist.

11. The method of claim 10, wherein the access information comprises at least one password for at least one process.

12. A system for tracking entities, comprising:
- at least one watchlist in a repository, the at least one watchlist comprising a plurality of watchlist entities, wherein each watchlist entry of the plurality of watchlist entries comprises an identity of an entity associated with the watchlist, a first unique identifier for identifying the at least one watchlist, a second unique identifier for identifying the watchlist entry, a third unique identifier for identifying the entity, and access control information for controlling access to processes associated with each of the plurality of watchlist entries; and
- a watchlisting module coupled to the repository and configured to maintain the at least one watchlist, the watchlisting module comprising:
  - a watchlisting engine configured to retrieve information from the at least one watchlist in the repository; and
  - an application interface configured to provide interfaces for interacting with the at least one watchlist, wherein the interfaces allow a user to interact with the at least one watchlist;
  - wherein the watchlisting engine is further configured to:
    - generate a state key for at least one watchlist entry, the state key comprising a first unique identifier for identifying the at least one watchlist, a second unique identifier for identifying the at least one watchlist entry, a third unique identifier for identifying a stored entity associated with the at least one watchlist entry, and access control information for controlling access to processes associated with the at least one watchlist entry; and
    - encrypt the state key to generate a state lock.

13. The system of claim 12, wherein the watchlisting engine is further configured to:
- perform a symmetric encryption process on the state key to generate the state lock.

14. The system of claim 12, wherein the watchlisting engine is further configured to:
- decrypt the state lock to retrieve the state key; and
- compare the state key to the at least one watchlist entry.

15. The system of claim 12, wherein the watchlisting engine is configured to manage processes associated with the at least one watchlist, the processes comprising nominating membership of entities to the at least one watchlist, approving membership of entities to the at least one watchlist, denying membership of entities to the at least one watchlist, and removing membership of entities from the at least one watchlist.

16. The system of claim 15, wherein the watchlisting engine is configured to allow access to processes based on at least one password for at least one process.

17. A non-transitory computer readable medium comprising instructions for causing a computer to perform a method for tracking entities, the method comprising:
- maintaining at least one watchlist in a repository, the at least one watchlist comprising a plurality of watchlist entities, wherein each watchlist entry of the plurality of watchlist entries comprises an identity of an entity associated with the watchlist, a first unique identifier for identifying the at least one watchlist, a second unique identifier for identifying the watchlist entry, a third unique identifier for identifying the entity, and access control information for controlling access to processes associated with each of the plurality of watchlist entries;
- providing interfaces for interacting with the at least one watchlist, wherein the interfaces allow a user to interact with the at least one watchlist;
- retrieving information from the at least one watchlist in the repository in response to user interaction with the interfaces; and
- providing the retrieved information to the user;
- wherein maintaining the at least one watchlist, comprises:
  - generating a state key for at least one watchlist entry, the state key comprising a first unique identifier for identifying the at least one watchlist, a second unique identifier for identifying the at least one watchlist entry, a third unique identifier for identifying a stored entity associated with the at least one watchlist entry, and access control information for controlling access to processes associated with the at least one watchlist entry; and
  - encrypting the state key to generate a state lock.

18. The computer readable medium of claim 17, wherein encrypting the state key comprises:
- performing a symmetric encryption process on the state key to generate the state lock.

19. The computer readable medium of claim 17, wherein maintaining the watchlist further comprises:
- decrypting the state lock to retrieve the state key; and
- comparing the state key to the at least one watchlist entry.

20. The computer readable medium of claim 17, wherein the processes associated with the at least one watchlist comprise nominating membership of entities to the at least one watchlist, approving membership of entities to the at least one watchlist, denying membership of entities to the at least one watchlist, and removing membership of entities from the at least one watchlist.

21. The computer readable medium of claim 20, wherein the access information comprises at least one password for at least one process.

* * * * *